April 12, 1927.   1,624,111
W. J. MULLALLY
HEAVY TENSION LAP LINK CHAIN
Filed Sept. 24, 1923    2 Sheets-Sheet 2
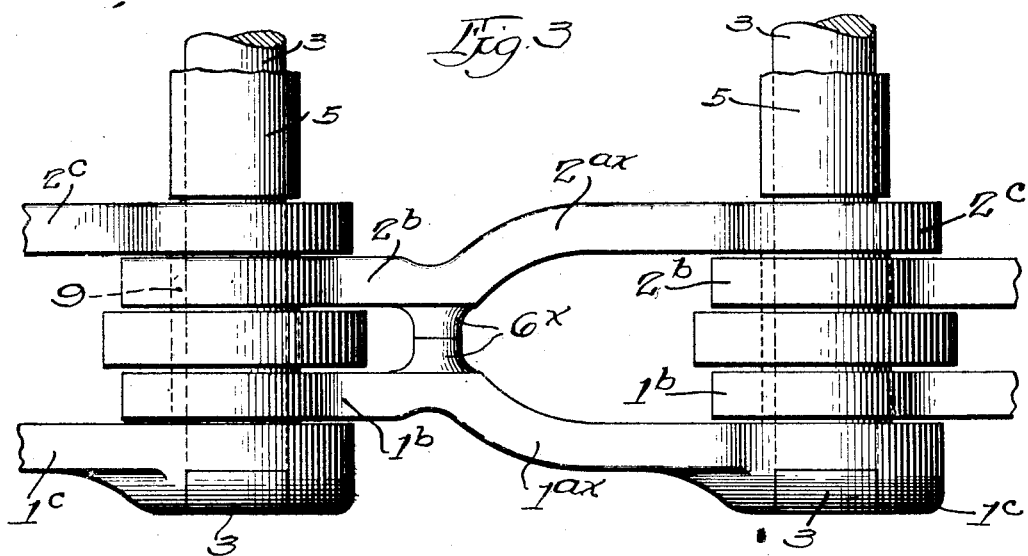
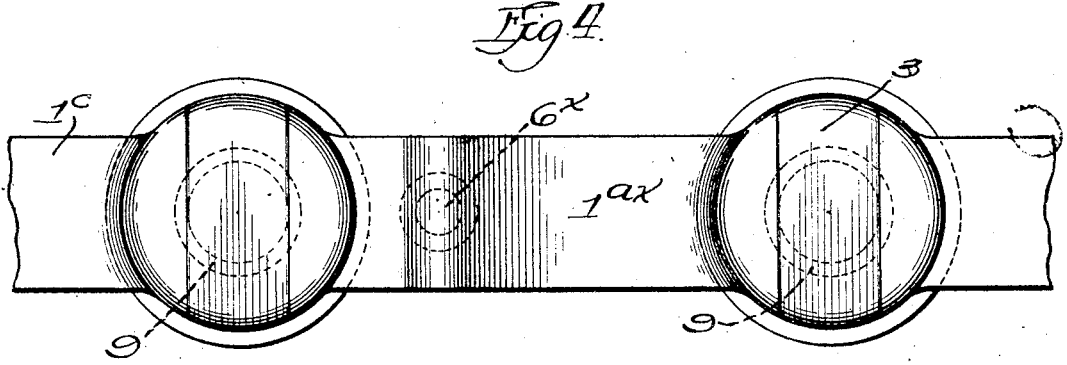
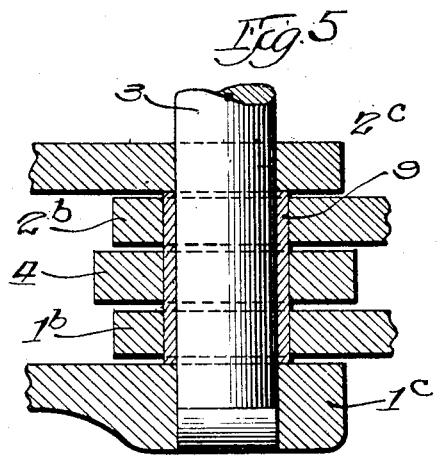
Inventor
Walter J. Mullally Patented Apr. 12, 1927.

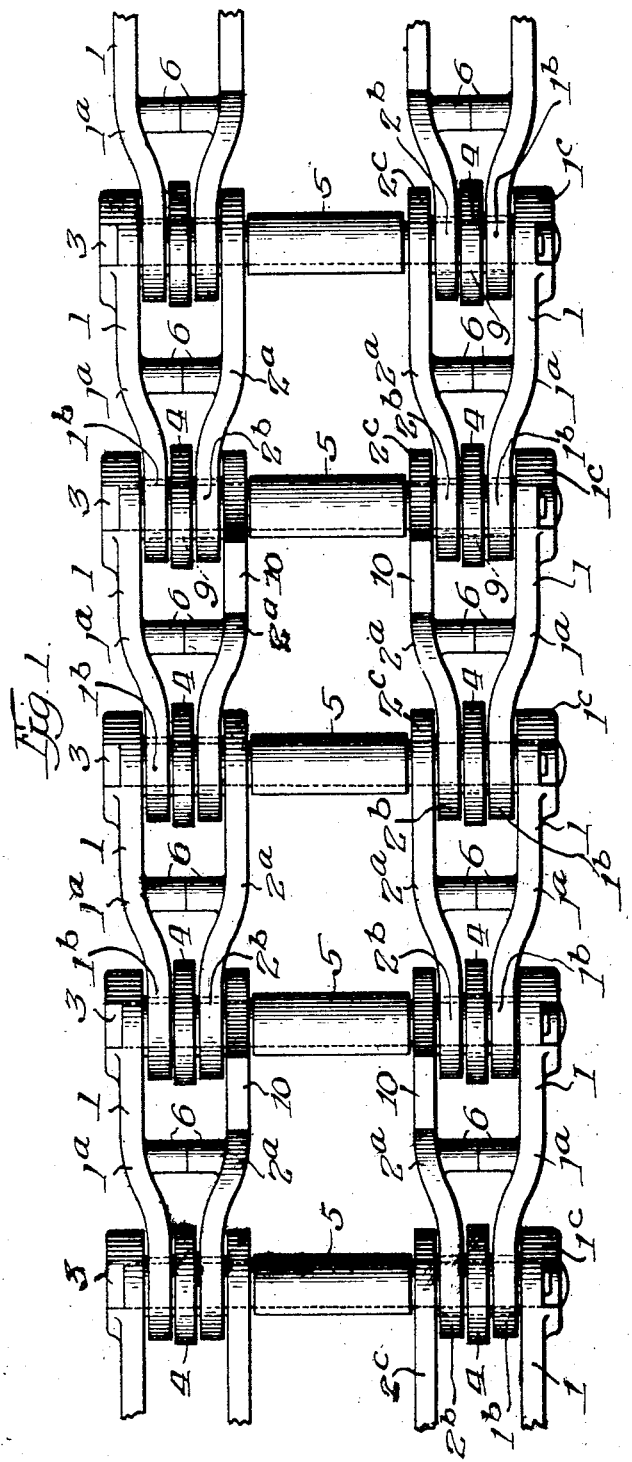

1,624,111

UNITED STATES PATENT OFFICE.

WALTER J. MULLALLY, OF CHICAGO HEIGHTS, ILLINOIS, ASSIGNOR TO AMERICAN MANGANESE STEEL COMPANY, OF CHICAGO, ILLINOIS, A CORPORATION OF MAINE.

HEAVY-TENSION LAP-LINK CHAIN.

Application filed September 24, 1923. Serial No. 664,636.

This invention relates to chains, the members of which are articulated through means of pintles passing transversely through lapped ends of the links, and in which the sides of the links are deflected intermediately of their ends to vary the spacing of their ends and permit them to lie alternately inside and outside the members of adjacent links; and particularly to chains of this class in which the side members of the links are formed in separate pieces.

In chains of this kind, particularly when used for work imposing heavy longitudinal stresses upon the chain, there is a tendency of the members which compose the links to straighten out and distort their ends through which the pintles pass, and bite or bind the bearing eyes of the links upon the pintles, as well as interfere with the free action of the antifriction rollers when used at the joints.

The object of the present invention is to avoid the aforesaid difficulty, while still permitting the links to be built up of separately formed side members; and one feature of the invention proceeds upon the principle of so constructing the separately formed side members that when assembled, they will be in abutment at points which will resist the deflection or straightening out of the link, and thus maintain their bearing eyes normal to the axis of the pintle, and their confining faces parallel to the sides of the other links or the antifriction rollers mounted on the pintles between them.

In the preferred embodiment of this feature of the invention, this sustaining abutment between the side members and the links is accomplished through means of a strut extending between the side members adjacent to their points of deflection, said strut being provided by means of lugs formed on the respective side members in position to abut together when the side members are assembled to form the link.

Another feature of the invention proceeds upon the principle of providing abutments for the ends of the outer link-members at the pintles of articulation, so that they cannot draw inward upon the intermediate link members or antifriction rollers, and this is preferably accomplished by introducing short sleeves within the intermediate ends and the rollers and around the pintles, and having these sleeves terminate just short of the outer link members.

In the accompanying drawings which show the aforesaid preferred embodiment by way of illustration—

Figure 1 is a plan view, and Figure 2 a side elevation of a portion of a heavy tension lap link chain in which the invention is embodied.

Figures 3 and 4 are, respectively, a plan view and a side elevation showing a modified construction of link and method of assembling the same; and Figure 5 is a detail view in section on the line $5^x$—$5^x$ of Figures 1 and 3.

1, 2 represent separately formed side members of the lap link chain, 3 represents a pintle which passes through the lapped ends of said members in order to articulate the links in building up the chain, 4 represents antifriction rollers journalled upon the pintles between the lapped ends of the members which form the links, and 5 represents a spacing sleeve interposed between the similarly constructed lines of a duplex chain in order to provide cross bars to receive the teeth of sprockets upon which the chain is guided and by which it may be driven in a manner well known in the art.

As thus far described, the parts may be of any construction, assembly, and design, in accordance with known practice. The side members 1, 2 are suitably deflected, as, for instance, at points $1^a$, $2^a$ in order to vary the spacing of the members at their ends and adapt them to lie alternately within and without the ends of adjacent links with which they lap and to which they are articulated. But under extreme longitudinal stress, there is a tendency of the side members 1 and 2 to draw into a straight diagonal line from center to center of their pintles, and thereby throw the perforated ends of said members out of normal relation to the pintles and to the antifriction rollers 4 lying mediately or immediately between them. In order to overcome this objection and still permit the members 1, 2 to be constructed separately, which is a very desirable condition of production, especially when the chain is to be used for dredging purposes, to meet the requirements of which it is necessary to produce its members of cast manganese steel, lugs 6 are formed upon the members 1, 2, preferably at the points 1ª, 2ª of deflection of said members, and in positions to insure abutment of the lugs and development of a transverse strut between them, the pintles 3 being relied upon to prevent torsional displacement of the side members 1, 2 and thereby hold in alignment and maintain the integrity of the strut without any connection other than abutment between the lugs, and without the necessity of making the lugs large and bulky.

According to Figures 3 and 4, the side members 1ᵃˣ, 2ᵃˣ of links, assembled similarly to links of Figures 1 and 2 through means of pintles 3 having bearing sleeves 5, have struts 6ˣ located adjacent their intermediate deflections but nearer the closely spaced ends 1ᵇ, 2ᵇ of said members, which latter are made substantially straight and parallel as far as the strut forming lugs, beyond which they curve outwardly to develop the necessary spacing of their ends 1ᶜ, 2ᶜ to receive the closely spaced ends 1ᵇ, 2ᵇ of the next link between them.

As shown by dotted lines in Figures 1 to 4, and in section in Figure 5, the spread ends 1ᶜ 2ᶜ of all the links may be spaced apart by means of sleeves 9 surrounding the pintles 3, and thereby prevented from drawing together and crowding upon the lapped ends 1ᵇ and 2ᵇ of the members of the adjacent link which lie between them, or upon the antifriction roller 4 which in this instance revolves upon the sleeves 9 instead of directly upon the pintles 3, as shown in Figures 1 and 2. This feature of spacing the outermost of the lapped ends by means of sleeves passing through the intermediate lapped ends and through the antifriction rollers is of further advantage in preventing distortion of those links in the chain which, in accordance with usual practice, are provided with elevating horns 10 for engaging rock and other obstructions to be excavated. That is to say, the sleeves 9 resist distortion of the spread ends 2ᶜ which carry these horns 10 under the action of a rock that tends to wedge between the horns.

Links constructed as herein described, may be successfully cast in manganese steel, and successfully heat treated, and when so formed can be conveniently assembled to form the chain, and when properly assembled, constitute a very light and cheap construction serving well the purposes for which it is intended.

I claim:

1. In heavy tension lap link chains, links composed each of two separately formed side members, oppositely deflected, intermediately of their ends, in the plane of the link, to vary their spacing at the respective ends of the link and to permit said ends to lap alternately within and without the members of adjacent links; said side members being formed with normally abutting but separable struts relatively movable in the direction of the length of the link extending across the links intermediate of their ends to resist straightening of the side members under longitudinal stress, but without transmitting longitudinal stress from one side member of a link to the other side member thereof.

2. In heavy tension lap link chains, links composed each of two separately formed side members, the side members of a link being each adapted to bear its load independently of the other and to move longitudinally one relatively to the other, and inwardly curving intermediately of their ends to vary their spacing at the respective ends of the link and permit said ends to lap alternately within and without the members of adjacent links; said side members being formed with normally abutting but separable struts extending across the links intermediate of their ends to resist straightening of the side members under longitudinal stress imposed upon the chain; said struts being composed of lugs formed upon the respective side members in position to abut together but leave them relatively movable lengthwise of the link in the assembly of said members to form the link.

3. In heavy tension lap link chains, links composed each of two separately formed side members, deflected intermediately of their ends to vary the spacing at their respective ends, sleeves separately spacing said links at one end, and lugs on the respective side members, adjacent their intermediate deflections, abutting together to resist straightening of the side members under longitudinal strains thereon, but relatively movable to avoid loading one side member by another.

4. In chains, links comprising separately formed side members, deflected intermediately of their ends, constructed with eyes and overlapped with the side members of adjacent links for articulation, pintles passing through the eyes and the overlapping ends, some of the side members of the links being constructed with horns for engagement with material to be elevated, spacing sleeves surrounding the pintles and spacing the side members which carry said horns, and strut-forming lugs on the side members adjacent said horns, and by their abutment preventing straightening of the links and displacement of the horns; the lugs being free to slide one relatively to the other in the direction of the length of the link.

Signed at Chicago Heights, Illinois, this 9th day of Sept., 1923.

WALTER J. MULLALLY.